Jan. 9, 1951 M. REISS 2,537,912
OBJECTIVE WITH VARIABLE SPACE
FOR CONTROLLING ABERRATIONS
Filed May 28, 1948 3 Sheets-Sheet 1
FIG. 1.
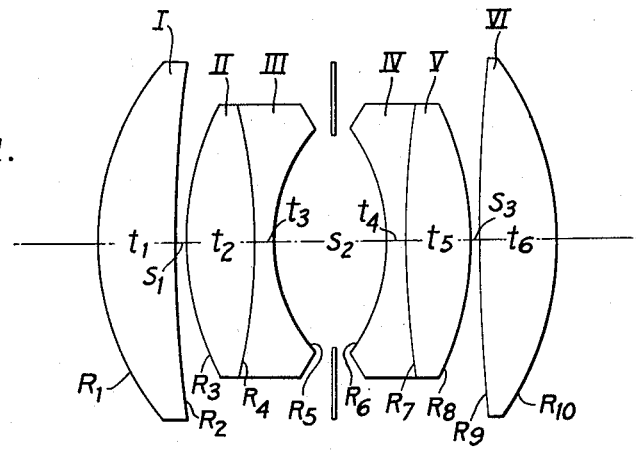
FIG. 2.
| F = 100 mm. | | | | f/4.5 |
|---|---|---|---|---|
| LENS | N | V | RADII | THICKNESSES |
| I | 1.434 | 95.2 | $R_1 = +25.3$ mm | $t_1 = 7.4$ mm. |
|  |  |  | $R_2 = +230.1$ | $S_1 = <2.0$ |
| II | 1.498 | 67.0 | $R_3 = +26.6$ | $t_2 = 6.5$ |
| III | 1.541 | 59.9 | $R_4 = -53.7$ | $t_3 = 1.6$ |
|  |  |  | $R_5 = +15.7$ | $S_2 = 11.0$ |
| IV | 1.562 | 51.0 | $R_6 = -17.5$ | $t_4 = 1.6$ |
| V | 1.501 | 56.5 | $R_7 = +81.0$ | $t_5 = 6.5$ |
|  |  |  | $R_8 = -28.8$ | $S_3 = 0.5$ |
| VI | 1.434 | 95.2 | $R_9 = +356.8$ | $t_6 = 7.4$ |
|  |  |  | $R_{10} = -28.5$ | BF = 73.7 |
FIG. 3.
| IMAGE DISTANCE | MAGNIFICATION | $S_1$ |
|---|---|---|
| 83.52 mm. | 10 : 1 | 0.95 mm. |
| 93.84 | 5 : 1 | 0.81 |
| 124.46 | 2 : 1 | 0.55 |
| 173.80 | 1 : 1 | 0.79 |
FIG. 4.
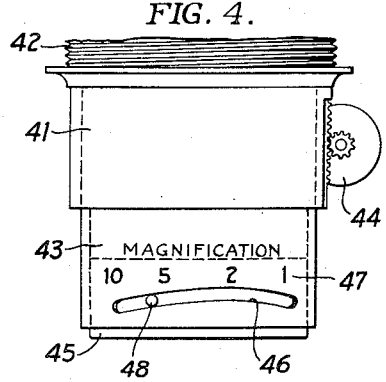
MAX REISS
INVENTOR
BY
Harold F. Bennett
ATT'Y & AG'T Jan. 9, 1951     M. REISS     2,537,912
OBJECTIVE WITH VARIABLE SPACE
FOR CONTROLLING ABERRATIONS Filed May 28, 1948     3 Sheets-Sheet 2

MAX REISS
*INVENTOR*

BY Newton M. Perris
Harold F. Bennett
*ATTORNEY & AGENT*

Jan. 9, 1951  M. REISS  2,537,912
OBJECTIVE WITH VARIABLE SPACE
FOR CONTROLLING ABERRATIONS

Filed May 28, 1948  3 Sheets-Sheet 3

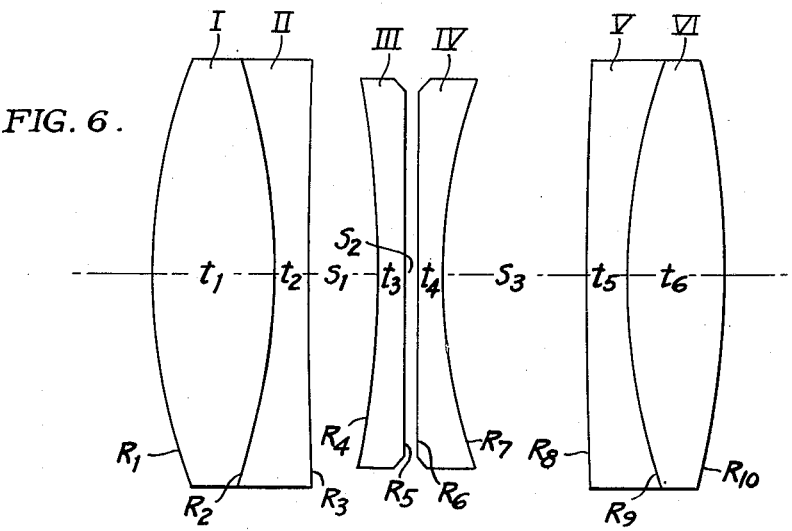

| EF = 100 MM. | | | | f/8.0 | |
|---|---|---|---|---|---|
| LENS | $N_D$ | V | RADII | | THICKNESSES |
| I | 1.611 | 57.2 | $R_1$ = + 27.07 mm | $t_1$ = | 5.81 mm. |
| II | 1.572 | 57.4 | $R_2$ = − 31.97 | $t_2$ = | 1.85 |
|  |  |  | $R_3$ = +299.0 | $S_1$ = | 3.12 |
| III | 1.605 | 38.0 | $R_4$ = − 63.33 | $t_3$ = | 1.11 |
|  |  |  | $R_5$ = ∞ | $S_2$ < | 1.0 |
| IV | 1.605 | 38.0 | $R_6$ = ∞ | $t_4$ = | 1.11 |
|  |  |  | $R_7$ = + 26.54 | $S_3$ = | 6.74 |
| V | 1.605 | 38.0 | $R_8$ = +469.4 | $t_5$ = | 1.85 |
| VI | 1.744 | 45.8 | $R_9$ = + 36.51 | $t_6$ = | 4.44 |
|  |  |  | $R_{10}$= − 62.64 |  |  |

FIG. 8.

| MAGNIFICATION | 15 TO 1 | 4 TO 1 |
|---|---|---|
| $S_2$ | 0.39 mm. | 0.56 mm. |
| EQUIVALENT FOCAL LENGTH | 99.93 mm | 99.87 mm. |
| BACK FOCAL LENGTH | 82.67 | 82.44 |
| LONG CONJUGATE | 1592. | 492.3 |
| SHORT CONJUGATE | 89.33 | 107.28 |
| SPHERICAL ABERRATION | +0.19 | +0.18 |
| PRIMARY CURVATURE 20.7° | +0.065 | +0.009 |
| SECONDARY CURVATURE 20.7 | +0.076 | +0.167 |

MAX REISS
INVENTOR
BY *Harold F. Bennett*
ATTORNEY & AGENT

Patented Jan. 9, 1951

2,537,912

UNITED STATES PATENT OFFICE 2,537,912

OBJECTIVE WITH VARIABLE SPACE FOR CONTROLLING ABERRATIONS

Max Reiss, Rochester, N. Y., assignor to Eastman Kodak Company, Rochester, N. Y., a corporation of New Jersey Application May 28, 1948, Serial No. 29,833

2 Claims. (Cl. 88—57)

This application is a continuation-in-part of my application Serial No. 542,913, filed June 30, 1944, now Patent No. 2,455,808, entitled Objective of Low Index Glass with Negative Components of High Curvature, issued December 7, 1948.

This invention relates to photographic lenses.

The object of the invention is to provide a photographic objective which maintains a very high degree of correction and resolving power throughout a considerable range of magnification, say from 1 to 1 up to 10 to 1 or from 20 to 1 up to infinity.

In most photographic objectives the best correction of the aberrations is found at some particular object distance, usually infinity, for which the aberrations were computed during the design of the lens. By "aberrations" is meant any of the usual aberrations described in standard books on geometrical optics, namely spherical aberration, coma, curvature of field, astigmatism, and distortion. In general, the aberrations are not as well corrected at other object distances, although the degree and nature of the loss of correction differs in different objectives.

This situation has long been recognized in a general way, and in fact mathematical proofs have been published showing that for example a change in spherical aberration with changing object distance is unavoidable in coma-corrected objectives. Ordinarily this difficulty is not serious and photographers have merely ignored it and accepted the degree of sharpness which the lens produced in the image. And as a matter of fact, for most purposes the image produced by a good lens is satisfactorily sharp even at object distances considerably different from the optimum. This is because the above-mentioned change in aberrations with change of object distance is a second-order effect which usually passes unnoticed in comparison with the residual aberrations in the usual run of good lenses or is below the threshold of resolution required for the purpose in hand.

In recent years however, film manufacturers have produced fine-grain films having very high resolution, and lens designers have improved the objective so that certain special but highly desirable effects can now be obtained by ordinary careful work which were previously possible only under closely controlled laboratory conditions if at all. One 35 mm. roll film is on the market with a measured resolving power of about 180 lines per mm. and a process sheet film with about 145. See for example the Kodak Data Book "Kodak Films," 4th edition, pages 13, 49, and 71. This booklet is available at photographic dealers.

The above figures pertain to results obtained with images formed on the film by special laboratory lenses. Some very recent work indicates that 500 or more interference fringes per millimeter can be resolved by the film alone. This indicates that at the present stage of technical progress the lens is the limiting factor in getting high resolution in photographic images, and that any improvement in lens performance is vital in this important field.

For several reasons, there has been very little specific data published heretofore on the resolving power of lenses. For one thing, the resolving power decreases from the center toward the edge, and no general agreement has been reached as to the one figure which will best describe the overall quality of the lens. Also, there are many variable factors (contrast, exposure, development and individual variations in lenses) which affect the results of any set of photographic measurements, and the actual worth of such data to the majority of lens users is problematical.

However, one standard method of measuring the resolving power of 16 mm. projection lenses is described in the Journal of the Society of Motion Picture Engineers, vol. 46, page 309, April 1946, and a study of mostly visual measurements on individual lenses of about fifteen different makes and types was published in the American Annual of Photography for 1934, pp. 220–237, but little if anything else has been published except brief passing references to the subject and purely theoretical discussions.

These background facts are mentioned to show that the high degree of correction to which the present invention relates is a comparatively new development in the photographic art, or at least it is highly unusual. It is of great importance for example in the micro-copying of documents and written records on film and in other specialized applications of photography in the technical arts where the sharp rendering of fine details is of prime importance. It is also very useful in miniature photography, where small negatives are greatly enlarged in printing.

According to the present invention, a plural-component objective which includes at least one component of each sign is mounted in a lens barrel with means for varying the distances of the two conjugate planes from the objective for changing the magnification and focusing. At least one component is mounted in a lens cell which is axially movable in the barrel relative to the rest of the objective so as to vary an airspace between two components. The airspace to be varied is selected as one having a marked effect on the aberration or aberrations which vary most noticeably when the magnification is changed, and the movement of the movable lens cell is definitely correlated with the magnification so as to maintain the optimum correction of the objective at all magnifications.

The correlating means may have any convenient form. If the focusing is done by hand, it may simply consist of a scale of magnification or object distances on the lens barrel and a pointer on the lens cell which is made rotatable and is manually adjusted at the time the camera is focused. On the other hand, if the objective is mounted in a copying camera with automatic focusing, it is more convenient to provide a cam or other mechanism so that the adjustment of aberrations is likewise automatic.

The scale or cam is made up according to the optimum spacing of the components at different magnifications. It has been rather common practice for lens designers when completing the design of a new objective to compute the effect of a change in each individual space upon the aberrations of the objective. These data are usually made up into a table of coefficients for the guidance of the manufacturer in the final assembly of the objective. According to this common practice, when an objective is assembled and found to have noticeable curvature of field or coma, for example, the table of coefficients is consulted and by inserting shims or by cutting material off of the mount, one or more of the spaces is adjusted so that the aberrations are within established tolerances at the particular magnification or conjugates selected as standard. In carrying out the present invention the lens designer goes a step further and determines the aberrations for a series of at least two magnifications extending through the range to be covered. It is usually found that in a highly corrected objective any considerable change of magnification (say from unity to ten times) changes the aberrations enough to destroy critical definition. By consulting the table of coefficients mentioned above, one of the spaces in the objective is selected which has its most marked effect upon whatever aberration deteriorates the most seriously. Then changes in that space are computed to restore that aberration, and the scale or cam is laid out accordingly. Changing only one space has been found to effect a marked improvement, and if greater refinement is required two spaces can be changed simultaneously by the same cam or by different cams as the case may be.

The above-described procedure, while not exactly easy, is no more difficult, now that the way has been pointed out, than a number of comparable procedures that lens designers are regularly called upon to do. And anyone who has tried to resolve photographically over 100 lines per millimeter already realizes that there is no easy way of maintaining this standard consistently. Furthermore, the cam or scale described above needs to be designed only once for each particular lens formula, and once the apparatus is built it needs little or no attention from the user. An alternative method previously used involves the interchanging of several objectives, each designed for use within a certain portion of the total required range of magnifications. The procedure according to the present invention is easier for the operator to follow and involves at the most no more work on the part of the lens designer.

Various means of mounting the movable lens cell will immediately suggest themselves, the simplest (but not always satisfactory) being simply to thread it into the barrel. This method of mounting is often used for a different purpose in objectives which are mounted at a fixed distance from the short-conjugate image plane and which are focused by moving the front element. Such objectives are of moderate or low quality, and the movement of the front element for focusing makes the aberrations worse instead of better. The threads as usually made are not accurate enough to maintain perfect alignment, although they are usually good enough to meet the comparatively low standards of front-focusing objectives.

In high quality objectives to which this invention relates, much better results are obtained by providing a sleeve fit between the movable lens cell and the barrel. Threading or a pin-and-slot arrangement or the like is provided to control the axial movement of the cell, while the sleeve fit maintains the axial alignment.

For the sake of definiteness as to what is meant by a "considerable range of magnifications," this phrase may be defined as meaning a range in which the arctangent of the square root of the magnification changes by more than 7°. In cases in which the magnification changes less than this amount, the aberrations do not usually change enough to necessitate the use of the present invention. In the examples shown below, this arctangent changes 10° or more. It will be noted that the arctangent changes by the same amount regardless of whether the magnification is given for the case of an enlargement (magnification greater than unity) or for the case of a reduction (magnification having the reciprocal value, less than unity) wherein the light travels in the reverse direction between the same pair of conjugate planes.

In the accompanying drawings:

Figs. 1 and 2 show a process lens and constructional data for the same.

Fig. 3 gives the variation in spacing of the components thereof according to the invention.

Fig. 4 shows a lens barrel for mounting the objective of Fig. 1 in a manually focused camera according to the invention.

Figs. 6 and 7 show an objective of another type.

Fig. 8 gives the variation in spacing of the components of the objective of Figs. 6 and 7.

Figure 9:
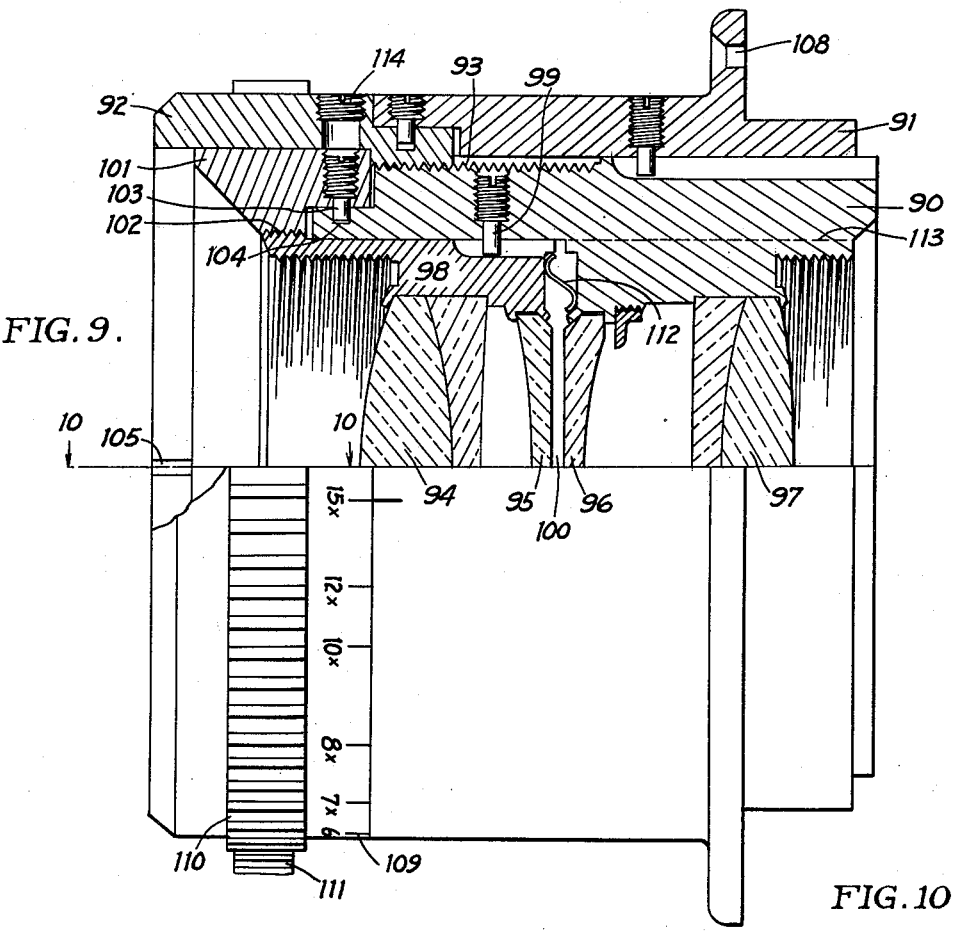

Fig. 9 is an elevation partly in section, of the objective of Fig. 6 mounted in a lens barrel according to the invention.

Figure 10:
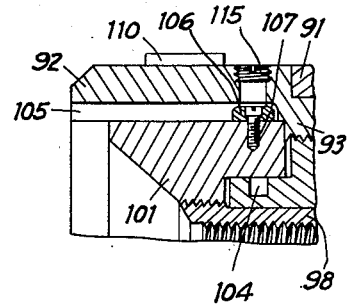

Fig. 10 is a partial horizontal section of the barrel of Fig. 9.

Figs. 1 and 2 show the objective which is described and claimed in the parent application and the constructional data therefor. This data is repeated here for convenience:

| Lens | N | V | Radii | Thicknesses |
|---|---|---|---|---|
| | | | $F=100mm.$ $f/4.5$ | |
| I | 1.434 | 95.2 | $R_1=+25.3$ mm. $R_2=+230.1$ | $t_1=7.4$ mm. $s_1<2.0$ |
| II | 1.498 | 67.0 | $R_3=+26.6$ | $t_2=6.5$ |
| III | 1.541 | 59.9 | $R_4=-53.7$ $R_5=+15.7$ | $t_3=1.6$ $s_2=11.0$ |
| IV | 1.562 | 51.6 | $R_6=-17.5$ | $t_4=1.6$ |
| V | 1.501 | 56.5 | $R_7=+81.0$ $R_8=-28.8$ | $t_5=6.5$ $s_3=0.5$ |
| VI | 1.434 | 95.2 | $R_9=+356.8$ $R_{10}=-28.5$ | $t_6=7.4$ $BF=73.7$ |

In this table, as also in the similar tables below, the lens elements are numbered by Roman numerals in the first column and the refractive indices N for the D line of the spectrum and the conventional dispersive index V are given in the second and third columns. The radii R, thicknesses $t$ and spaces $s$, each numbered by subscripts from front to rear, are given in the last two columns of the table. The + and − signs on the radii denote surfaces that are respectively convex and concave to the front.

This lens is apochromatic and is very well corrected for zonal spherical aberration, and accordingly, it is capable of giving a very sharp image over a moderate field. However, it was found that the spherical aberration changes when changing from 10× magnification to 2× magnification by an amount which would scarcely be detectable in ordinary objectives but which noticeably decreases the critical sharpness which this objective is capable of producing. The change in curvature of field, however, is not too serious over the moderate field covered in the particular use being considered.

In accordance with the invention, the effect of changing each space, was studied and it was found approximately that an increase of 0.1 mm. in the front space changed the spherical aberration (f/4.5) by −0.11 mm., the 20° primary curvature by −0.06 the 20° secondary curvature by −0.02, the distortion by −0.03 and the coma as defined by the offense against the sine condition by −0.0003. Each of the other spaces has less effect on the spherical aberration in comparison with its effect on the other aberrations, and so the front space was chosen as the one to be varied to maintain correction of spherical aberration.

Fig. 3 gives a series of four values of the image distance or short conjugate distance and the magnification and optimum value of $s_1$ corresponding thereto. This table is repeated here, with values of equivalent focal length and back focal length added:

| Image Distance | Magnification | Front Space $S_1$ | Equivalent Focal Length | Back Focal Length |
|---|---|---|---|---|
| | | Mm. | | |
| 83.52 | 10× | 0.95 | 99.85 | 73.53 |
| 93.84 | 5× | 0.81 | 99.88 | 73.87 |
| 124.46 | 2× | 0.55 | 99.94 | 74.49 |
| 173.80 | 1× | 0.79 | 99.89 | 73.91 |

This movement of the front component is not to be confused with that in known front-focusing objectives. There are several distinguishing features. In the first place, the front-focusing objectives are always mounted with the rear components at a fixed distance from the image plane; that is the chief reason for having front-focusing objectives, the fixed mounting being more economical. On the other hand, as shown in Fig. 3 and the above table, the whole objective moves relative to the focal plane in the present invention. The movement of the front component is only slightly different from that of the rear components, the greatest percentage difference in this example being from 10× to 5×, for which range the front component moves away from the image plane 101.4% as far as the rest of the objective. In other words, the change in the variable space is 1.4% of the change in image distance in this objective and is not likely to be more than 33% in any objective.

Another feature which distinguishes the present invention is that the change in space is much smaller than that which would be required for a front focusing objective, and in the present example it reverses its direction and over a part of the range of magnifications it is actually in the wrong direction to be an aid to focusing. It is not likely that this change in space would change the back focal length by more than 20% of the corresponding change in short conjugate distance in any objective.

Still another difference between the present invention and the customary front focusing objectives is that the present invention is not concerned with the dioptric power of the portion of the objective which is movable relative to the rest of the objective, whereas in objectives useful for front focusing the movable lens needs to be comparatively strong, usually stronger than the objective as a whole. The present invention is just as useful in objectives in which the power of the movable part of the objective happens to be zero or negative as in objectives in which it is positive.

Fig. 4 shows a lens mount according to the invention adapted for mounting the objective shown in Figs. 1 and 2 in accordance with the data of Fig. 3. The lens barrel 43 holds the lens components II to VI of Fig. 1 in the usual manner of mounting lenses. The lens-cell 45 holds the lens component I of Fig. 1 in the usual way and has a sleeve fit in the barrel 43 as shown diagrammatically by broken lines. An almost circumferential slot 46 is cut in the barrel 43 having a shape in accordance with the data of Fig. 3, and a pin 48 is set in the cell 45 to engage the slot so that when the cell 45 is rotated it is moved slightly in an axial direction. A scale 47 is engraved or otherwise marked on the barrel 43 along the length of the slot 46 and shows a series of designations of magnifications in accordance with Fig. 3. The lens barrel 43 is mounted in a sleeve 41, and a rack and pinion 44 is provided for sliding the whole objective up and down in the sleeve for focusing. The sleeve 41 is provided with threads 42 for attaching the whole assembly to the body of the camera (not shown) in a well-known manner.

In operation, the cell 45 is rotated until the pin 48 stands at the magnification which is to be used. The pin 48 in the slot 46 slides the lens cell 45 in an axial direction relative to the barrel 43, and the shape of the slot is such that the space $s_1$ between the component I and the component II is then in accordance with the values given in Fig. 3 corresponding to the chosen magnification. This axial shift may happen to make a barely perceptible change in the focusing, but in general it does not focus for the chosen magnification. The camera body as a whole (not shown) is fixed on a support in the customary manner at a suitable distance from the copy (not shown). This distance is easily determinable in known manner. The barrel 43 is then racked up and down by the rack and pinion 44 to focus the image sharply.

It will be noted that both the two conjugate distances and the spacing of the components are changed and that the slot and scale provide means for definitely correlating the variable spacing with the magnification, that is to say with the conjugate distances, so as to maintain the best image at all magnifications. No experimenting is required on the part of the operator to determine the best spacing. This simple arrangement is very satisfactory in manually focused cameras.

Figure 5:
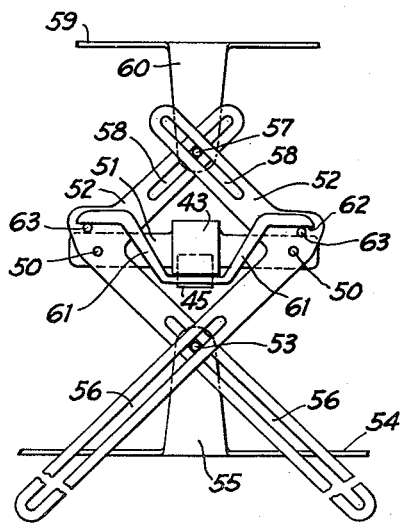
Fig. 5 shows a mount for the objective of Fig. 1 in an automatically focused camera according to the invention.

Many mechanical arrangements are known for automatically focusing a copying camera. Fig. 5 is a schematic diagram of one well-known type using straight cams. As shown this mechanism is modified to vary the spacing of the lens components automatically. The objective is mounted in the barrel 43 with one of its components in the lens cell 45 as in Fig. 4. The two pins 50 are mounted on the arms 51 rigidly attached to the lens barrel. The elbow members 52 are rotatably mounted on the pins 50 and are caused to rotate by the pin 53 rigidly attached to the copy board 54 by a bracket 55 and working in the straight slots 56 when the copy board is moved to or from the objective. The elbow members 52 in turn control the position of the pin 57 which slides in the slots 58 and which is rigidly attached to the film support 59 by the bracket, 60. Guides (not shown) and a covering (not shown) are provided to keep the parts in mutual alignment and to exclude extraneous light from the film in a manner too well known to need description. In the mechanism as shown the pins 50 are separated from each other by twice the focal length of the objective.

In order to control the spacing of the lens components according to the invention, brackets 61 are attached to the lens cell 45 and are provided with straight faces 62 which are held by gravity or by springs (not shown) against pins 63 which are set one in each elbow member 52. In the particular case of the objective shown in Figs. 1 and 2, each pin 63 is set at a distance of 5.16 mm. from the neighboring pin 50 in a direction about 16.5° from the vertical when the linkage is adjusted for unit magnification as shown. The brackets 61 are adjusted relative to the lens cell 45 to give a spacing $s_1$ equal to 0.77 mm., whereupon the spacing at magnification $2\times$ is 0.57, at $4\times$ it is 0.79 and at $10\times$ it is 0.97, differing only about 0.02 mm. in theory from the corresponding values given in Fig. 3. This is accurate enough for nearly all purposes, and if greater refinement is desired only a little touching up of the straight faces 62 is sufficient to provide it.

Figs. 6 and 7 show an objective of another type, and constructional data therefor. This data is given in the same manner as in Fig. 2 and is repeated here for convenience.

EF=100 mm.   F/8

| Lens | N | V | Radii | Thicknesses |
|---|---|---|---|---|
| I | 1.611 | 57.2 | $R_1=+27.07$ mm. | $t_1=5.31$ mm. |
| II | 1.572 | 57.4 | $R_2=-31.97$ | $t_2=1.85$ |
|   |   |   | $R_3=+299.0$ | $s_1=3.12$ |
| III | 1.605 | 38.0 | $R_4=-63.33$ | $t_3=1.11$ |
|   |   |   | $R_5=\infty$ | $s_2<1.0$ |
| IV | 1.605 | 38.0 | $R_6=\infty$ | $t_4=1.11$ |
|   |   |   | $R_7=+26.54$ | $s_3=6.74$ |
| V | 1.605 | 38.0 | $R_8=+469.4$ | $t_5=1.85$ |
| VI | 1.744 | 45.8 | $R_9=+36.51$ | $t_6=4.44$ |
|   |   |   | $R_{10}=-62.64$ |   |

This objective is an embodiment of my invention designed by Fred E. Altman and special features thereof are described in a copending application, Serial No. 29,799, Altman, filed concurrently herewith, now U. S. Patent 2,494,025. It was designed for microfilm copying of printed matter in a greatly reduced size, with a photographic resolving power of at least 100 ruled lines per millimeter at the center and 80 per millimeter near the edge of the picture.

In this case the aberration which caused the most trouble when the magnification was changed was the curvature of field. The following values were computed for a lens differing only slightly from the example specified in Fig. 7:

| Magnification | 15:1 | 4:1 |
|---|---|---|
| 20.7° Primary curvature | 0.09 | −0.99 |
| 20.7° Secondary curvature | +0.05 | −1.81 |

Thus the field curvature changes by well over a millimeter, which is more than enough to lose the critical definition required in this work. The final form of this species of my invention was computed with the central space $s_2$ selected as the variable one, and the results are given in the following table, part of which is also given in Fig. 8:

| Magnification | 15:1 | 4:1 |
|---|---|---|
| $s_2$ | 0.39 mm. | 0.56 mm. |
| Equivalent focal length | 99.93 mm. | 99.87 mm. |
| Back focal length | 82.67 | 82.44 |
| Front focal length | 92.82 | 92.81 |
| Long conjugate | 1592 | 492.3 |
| Short conjugate | 89.33 | 107.28 |
| Spherical aberration F/8 | +0.19 | +0.18 |
| Primary curvature 20.7° | +0.065 | +0.009 |
| Secondary curvature 29.7° | +0.076 | +0.167 |
| Primary curvature 15° | +0.041 | +0.013 |
| Secondary curvature 15° | −0.270 | −0.350 |
| Lateral color (G'-D) | +0.006 | +0.010 |

It will be noted that the change in the central space $s_2$ is about $1/106$ of the change in the short conjugate. This lens has been found to give highly satisfactory results. Also it has been found adequate in practice simply to make the change in the space linearly proportional to the change in the short conjugate, for intermediate magnifications.

Figs. 9 and 10 show a mount designed specifically for the objective shown in Figs. 6, 7 and 8, but easily adaptable to other types of objective. This mount was designed by Altman and Joseph Blash and is described in their joint application, Serial No. 29,798, filed concurrently herewith, now Patent Number 2,529,894, issued November 14, 1950. The lens barrel 90 is splined to the sleeve 91 for focusing when the focusing ring 92 is rotated. The focusing ring 92 is keyed to rotate in the sleeve 91 and moves the barrel 90 by the multiple threads 93, preferably moving it 18 mm. in less than 360° rotation. The two rear lens components 96 and 97 are fixedly mounted in the barrel 90. For ease in manufacture, the barrel 90 is divided into two parts as indicated by the broken line 113. The front two components 94 and 95 are mounted in a lens cell 98 which is splined in the barrel 90 by the key and short keyway 99. The cell 98 is moved forward or backward in the barrel 90 by the ring 101 threaded to the cell by the threads 102 and keyed to the barrel 90 by the key 103 and circumferential keyway 104, when the ring 101 is rotated relative to the barrel and lens cell. The threads 102 have a pitch about $1/106$ of that of the multiple threads 93, and slack is taken up in these threads by a compression spring 112. The focusing ring 92 is provided with a keyway 105 in a different azimuth from key 103 (shown 90° away in Fig. 9 and in detail in Fig. 10). The sleeve 91 is provided with conventional means 108 for attaching it to the camera at a fixed distance from the image plane (the short conjugate image). To improve the appearance, plugs 114 and 115 are inserted into the holes provided for inserting key 103 and screw 107 during assembly.

When the objective is assembled in the mount ready for final adjustment, it is mounted on a lens bench where the curvature of field can be measured at finite conjugates. The focusing ring 92 is provided with a scale 109 which is then set to indicate the magnification for which the lens bench is set up. The ring 101 is rotated until the lens bench measurements indicate that the field is flat, whereupon it is tapped for the screw 107 for holding the key 106 and the said key 106 is inserted into the keyway 105 and attached. The objective is then ready for use, and the ring 101 rotates with the focusing ring 92 but slides with the barrel 90 so that the change in the central space 100 is $1/106$ of the change in the short conjugate distance in accordance with this form of the invention. The mount is adapted to other objectives by using a different relative pitch of the threads and, if the relative movement is non-linear, by cutting the keyway 105 curved or by substituting a pin and curved slot for the threads 102. The focusing ring 92 is provided with knurling for manual operation or gear teeth 110 meshing with a control gear or rack 111 for automatic focusing. One form of automatic focusing which has been very satisfactory in practice is described in Patent No. 2,364,362, Hopkins. The gear teeth 110 and the control gear 111 correspond to the gear 38 and the rack 37 shown most clearly in Fig. 2 of that patent.

A further example of an objective to which the present invention has been applied is that described as Example 2 in U. S. Patent 2,397,565, Schade, issued April 2, 1946. The constructional data for this objective is as follows:

EF—52 mm.    f/1.5

| Lens | N | V | Radii | Thicknesses |
|---|---|---|---|---|
| I | 1.638 | 55.5 | $R_1=+36.9$ mm. | $t_1=6.3$ mm. |
|   |       |      | $R_2=+143.4$    | $s_1=0.3$ |
| II | 1.617 | 38.5 | $R_3=+25.4$    | $t_2=3.0$ |
| III | 1.638 | 55.5 | $R_4=+15.1$   | $t_3=7.1$ |
|    |       |      | $R_5=+48.2$    | $s_2=2.2$ |
| IV | 1.673 | 32.2 | $R_6=-302.2$  | $t_4=1.8$ |
|    |       |      | $R_7=+17.6$    | $s_2=5.4$ |
| V | 1.638 | 55.5 | $R_8=+60.5$    | $t_5=6.9$ |
| VI | 1.590 | 61.6 | $R_9=-17.4$   | $t_6=1.8$ |
| VII | 1.697 | 56.1 | $R_{10}=+29.5$ | $t_7=5.4$ |
|     |       |      | $R_{11}=-167.5$ |       |

This objective was found to give a very sharp image of distant objects in comparison with other f/1.5 objectives, but it was observed that the field had a tendency to curve inward for near objects. Also a little "high order" coma (called rim ray coma) appeared.

The following table of coefficients of space changes is computed for an increase of 0.1 mm. in each space for the convenience of the factory in assembling the objective:

| Space No. | $S_1$ | $S_2$ | $S_3$ |
|---|---|---|---|
| Change in: |  |  |  |
| Space | +.10 mm. | +.10 mm. | +.10 mm. |
| EF | +.032 | −.016 | −.020 |
| BF | −.047 | −.206 | −.002 |
| Spherical Aberration, f/1.5 | −.026 | −.082 | −.001 |
| Sine Condition Coma, f/1.5 | −.013 | −.070 | −.028 |
| Secondary Curvature, 15° | −.002 | +.096 | −.015 |
| Primary Curvature, 18° | −.001 | +.067 | +.038 |
| Distortion 18° | +.012 | +.027 | +.016 |

In order to carry out the invention, it is observed from this table that a change in the rear space $S_3$ has an extremely small effect upon the back focal length BF and the spherical aberration. It has only a moderate effect on the equivalent focal length EF and the distortion, but it has a marked effect on the coma and especially the curvature of field, which are the two aberrations which cause the most noticeable deterioration in the image at near object distances. Fortunately, the effect on these two aberrations is in the right direction for both. The change in space $S_3$ required to restore the curvature of field at a series of near object distances is such that the observed coma is within reasonable tolerances. The values of $S_3$ are given in the following table, for a 52 mm. focal length objective:

| Object Distance | Magnification | Rear Space | Back Focal Length | Image Distance |
|---|---|---|---|---|
| Ft. |  | Mm. |  |  |
| ∞ | 0.000 | 5.44 | 25.62 | 25.62 |
| 50 | .003 | 5.45 | 25.62 | 25.78 |
| 15 | .011 | 5.50 | 25.62 | 26.19 |
| 8 | .021 | 5.62 | 25.62 | 26.72 |
| 5 | .034 | 5.84 | 25.63 | 27.39 |
| 3.5 | .050 | 6.09 | 25.63 | 28.23 |

As a further illustration of the difference between this invention and front-focusing objectives, it will be noted that the maximum change in image distance as measured from the last lens surface is 2.61 mm. and that the maximum change in space is 0.65 or 25% thereof. Also the change in back focal length as measured from the last lens surface is only 0.01 mm. or less than 1% of the change in image distance. That is to say, the space would have to be changed more than 100 times as much in this example to effect the required focusing, and of course the aberrations would change so greatly as to render the lens practically useless long before reaching that point.

Any of the forms of mounts shown in Figs. 4, 5, or 9 are also useful with this last example.

In any lens of focal length F the magnification M equals $$\frac{F}{S}$$

where $F+S$ is the short conjugate distance. At unit magnification this distance equals $F+F$ and at a magnification of 10 it equals $F+.1F$. As pointed out above the slight changes in F which are incidental to the minute changes in one of the air-spaces (to correct aberrations) are negligible and the present invention is not concerned therewith. Thus for all practical purposes the focal length of the present lenses is constant and the above general formula relative to change in the short conjugate distance is applicable.

I claim:

1. A highly corrected mounted photographic objective with two separate independent but co-operating adjusting means, one for adjusting focus and the other for adjusting the correction of aberrations to an optimum value for each setting of the focus adjusting means consisting of four axially aligned air spaced components two of which are compound the airspace between two of the components being slightly adjustable, the four components as a unit being corrected for lens aberrations over a range of magnifications from 1:1 to 10:1, the optimum correction at different magnifications using slightly different values of said adjustable airspace, said focus adjusting means moving the four components as a unit axially to change the short conjugate axially from 2F to 1.1F, where F is the focal length of the objective, to give said range of magnifications and the other adjusting means moving the components relative to each other to change said adjustable airspace an amount less than 1% of F to the value which gives said optimum correction for each magnification and means for preventing said other adjusting means from changing said airspace by an amount more than 1% of F.

2. A highly corrected mounted objective according to claim 1 including means coupling the focus adjusting means to the airspace adjusting means to move both only simultaneously and to maintain said optimum correction.

MAX REISS.

REFERENCES CITED

The following references are of record in the file of this patent:

UNITED STATES PATENTS

| Number | Name | Date |
|---|---|---|
| 341,887 | Collison | May 18, 1886 |
| 461,609 | Gundlach | Oct. 20, 1891 |
| 583,336 | Rudolph | May 25, 1897 |
| 1,394,078 | Frederick | Oct. 18, 1921 |
| 1,463,132 | Graf | July 24, 1923 |
| 1,883,673 | Fouquet | Oct. 18, 1932 |
| 2,263,024 | Wood | Nov. 18, 1941 |
| 2,271,227 | Lee | Jan. 27, 1942 |
| 2,349,893 | Warmisham et al. | May 30, 1944 |
| 2,430,121 | Goodwin | Nov. 4, 1947 |

Certificate of Correction

Patent No. 2,537,912

January 9, 1951

MAX REISS

It is hereby certified that error appears in the printed specification of the above numbered patent requiring correction as follows:

Column 9, in the table, under the heading "Thicknesses", line 7 thereof, for "$s_2 = 5.4$" read $s_3 = 5.4$;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*